No. 691,591. Patented Jan. 21, 1902.
A. T. BROWN.
GEARING.
(Application filed Jan. 2, 1901.)
(No Model.)
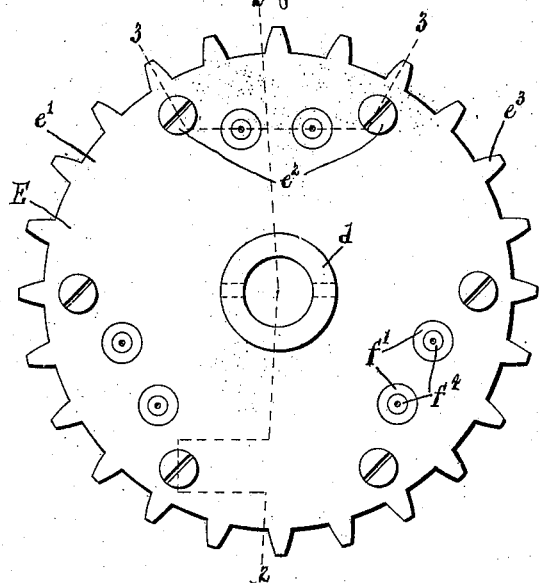
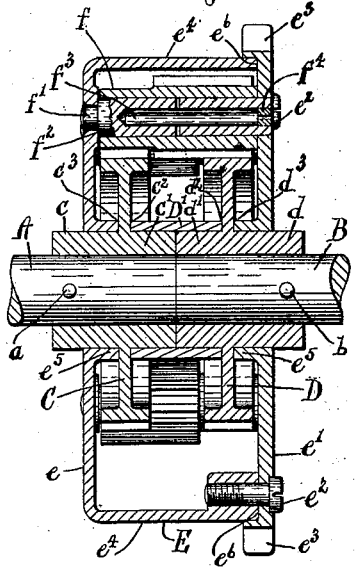
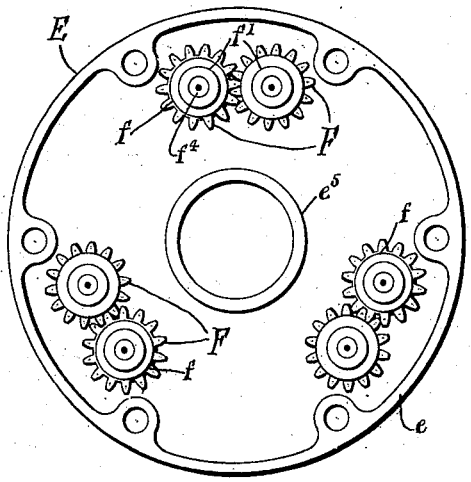
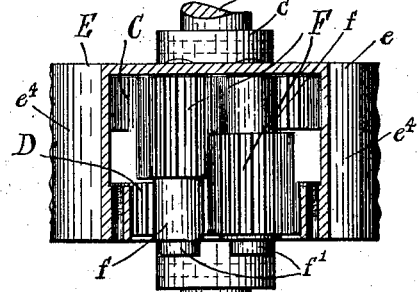
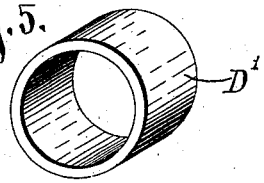
WITNESSES:
INVENTOR
Alexander T. Brown.
BY
Heys Parsons
ATTORNEYS

UNITED STATES PATENT OFFICE.

ALEXANDER T. BROWN, OF SYRACUSE, NEW YORK.

GEARING.

SPECIFICATION forming part of Letters Patent No. 691,591, dated January 21, 1902.

Application filed January 2, 1901. Serial No. 41,817. (No model.)

*To all whom it may concern:*

Be it known that I, ALEXANDER T. BROWN, of Syracuse, in the county of Onondaga and State of New York, have invented certain new and useful Improvements in Gearing, of which the following is a specification.

This invention has for its object the production of a gear popularly known as a "differential" or "compensating" gear which is particularly simple in construction, economical in manufacture, and highly efficient and durable in use; and to this end it consists in the devices and combinations hereinafter set forth and claimed.

Figure 1 is a face view of my differential gear, the alined shafts being removed. Figs. 2 and 3 are sectional views taken, respectively, on lines 2 2 and 3 3, Fig. 1, the alined shafts being shown in position in both views and one section of the power-transmitting member being removed in Fig. 3. Fig. 4 is a face view of one of the detached sections of the power-transmitting member of my differential gear, the pinions being shown in position within said section. Fig. 5 is an isometric view of the sleeve for connecting contiguous sides of the gear-wheels fixed to the two alined shafts.

My differential gear comprises, essentially, two alined shafts A and B, two gear-wheels C and D, a power-transmitting member E, and pinions F. The shafts A and B are of any desirable form, size, and construction, being here illustrated as arranged end to end. It will be obvious, however, that one of said shafts may consist of a sleeve encircling a part of the other shaft. The gear-wheels C and D are preferably spur-gears, are respectively fixed to the shafts A and B, and are usually disposed side by side and provided with hubs $c$ and $d$, projecting from their outer side faces, and additional hubs or cylindrical surfaces $c'$ and $d'$, projecting from their inner or adjacent side faces and having their contiguous end faces engaged with each other, as seen in Fig. 2. Said hubs $c'$ and $d'$ are generally inclosed by a sleeve D', interposed between the main bodies of the spur-gears C and D and closely fitting said hubs and having its end faces engaged with annular faces $c^2$ and $d^2$, provided on the main bodies of said gears C and D at the bases of the hubs $c'$ and $d'$. The sleeve D' tends to prevent lateral springing or movement of the ends of the shafts A and B and adds to the practicability and durability of my differential gear.

The power-transmitting member E usually consists of a hollow case which substantially incloses the gear-wheels C and D, is composed of separable sections $e$ and $e'$, united together by suitable fastening means $e^2$, and is provided with opposite side walls and with a peripheral wall provided with a braking-surface $e^4$, one of the side walls being fixed to one end of the peripheral wall and comprising, with said peripheral wall, the section $e$, and the other side wall being formed with sprocket-teeth $e^3$ and comprising the section $e'$. Said power-transmitting member E is arranged concentric with the gears C and D, is disconnected from the sleeve D', is movable independently of said gears and sleeve, and is loosely mounted on the hubs $c$ and $d$, its opposite side walls having their central portions provided with openings, which receive and closely fit the hubs $c$ and $d$. The outer faces of the opposite side walls of the power-transmitting member are separated a less distance than the end faces of the hubs $c$ and $d$, and consequently said hubs project outwardly beyond the outer faces of said opposite side walls for receiving suitable fastening means, as pins $a$ and $b$, passed diametrically through the hubs $c$ and $d$ and the shafts A and B at the outside of the side walls of the power-transmitting member. The inner faces of the opposite side walls of the power-transmitting member are formed with inwardly-extending hubs or flanges $e^5$, having their internal faces engaged with the hubs $c$ and $d$ and their end edges engaged with annular faces $c^3$ and $d^3$, provided on the gears C and D at the bases of the hubs $c$ and $d$. Said hubs or flanges $e^5$ afford a large bearing-surface for the power-transmitting member E without materially increasing the weight thereof and add greatly to the practicability and durability of my differential gear. The internal face of the peripheral wall of the power-transmitting member E is provided with inwardly-projecting extensions, which are disposed between the pairs of pinions F and are engaged by the fastening means $e^2$ for securing the sections $e$ $e'$ together independently of the spindles $f'$, presently described. The inner face of said section $e'$ of the power-transmitting member E is also provided with a recess $e^6$ for receiving the contiguous end of the section $e$ of the member E, the peripheral wall of said recess forming a flange, which projects from the inner face of the section $e'$, is lapped upon the contiguous portion of the periphery of the section $e$, and serves to conceal and protect the joint between said sections $e$ and $e'$.

The pinions F are arranged one in advance of the other within the power-transmitting member E and concentric with the parts A, B, C, D, and E, previously described, in substantially equidistant pairs, with their axes parallel with the axes of said parts, are interposed between the sleeve D′ and the peripheral wall of the hollow power-transmitting member E, and are supported at opposite ends by the opposite side walls of the member E. One end of each pinion of each pair of said pinions is engaged with one of the spur-gears C and D, and the opposite end of said pinion is engaged with the other pinion of said pair of pinions and is generally provided with a hub $f$, formed of less diameter than the toothed face of said pinion and alined with the other spur-gear. Said pinions are preferably mounted on spindles $f'$, disposed substantially parallel with the axes of the shafts A and B and having corresponding extremities fixed in openings extending through the inner and outer faces of one of the side walls of the power-transmitting member E and their other extremities detachably arranged in openings extending through the inner and outer faces of the opposite side wall of said member E. The spindles $f'$ are provided with lengthwise oil-containing chambers $f^3$, extending inwardly from corresponding ends thereof and formed with closed inner ends, and are also provided with exit-passages leading from the chambers $f^3$ through the peripheries of the spindles and plugs $f^4$, which close the outer ends of the chambers $f^3$ and are formed with perforations extending through their inner and outer faces. Said spindles $f'$ strengthen the power-transmitting member and form a particularly strong, durable, and effective means for supporting the pinions F.

In the use of my invention the power-transmitting member E drives both shafts A and B and both shafts rotate in the same direction or in reverse directions.

The construction and operation of my gear will be readily understood upon reference to the foregoing description and the accompanying drawings, and it will be obvious to those skilled in the art that more or less change may be made in the construction and arrangement of its parts without departing from the spirit of my invention.

Having thus fully described my invention, what I claim as new, and desire to secure by Letters Patent, is—

1. In a differential gear, the combination of two alined shafts arranged end to end, two spur-gears disposed side by side and fixed respectively to the shafts, said spur-gears having their inner side faces provided with projecting hubs, a sleeve interposed between the main bodies of the spur-gears and closely fitting said hubs, a hollow power-transmitting member disconnected from the sleeve and arranged concentric with the shafts and the sleeve and formed with opposite side walls at the outer sides of the peripheral faces of the spur-gears, and a pair of pinions interposed between the sleeve and the peripheral wall of the hollow power-transmitting member and having their ends supported by the side walls of the power-transmitting member and their axes disposed substantially parallel with the axes of the shafts, said pinions being engaged with each other and respectively engaged with the spur-gears, substantially as and for the purpose described.

2. In a differential gear, the combination of two alined driven shafts arranged end to end, two spur-gears disposed side by side and fixed respectively to the shafts, said spur-gears having their inner and outer side faces provided with projecting hubs, the end faces of the inner hubs being engaged with each other, a sleeve closely fitting the inner hubs of the spur-gears and having its end edges engaged with inner side faces of the main bodies of the spur-gears, a hollow power-transmitting member for driving both shafts, said member being disconnected from the sleeve and arranged concentric with the shafts and the sleeve and formed with opposite side walls loosely mounted on the outer hubs of the spur-gears, and a pair of pinions interposed between the sleeve and the peripheral wall of the hollow power-transmitting member and having their ends supported by the side walls of the power-transmitting member and their axes disposed substantially parallel with the axes of the shafts, said pinions being engaged with each other and respectively engaged with the spur-gears, substantially as and for the purpose described.

3. In a differential gear, the combination of two alined driven shafts arranged end to end, two spur-gears disposed side by side and fixed respectively to the shafts, said spur-gears having their outer side faces provided with projecting hubs, a hollow power-transmitting member for driving both shafts, said member being arranged concentric with the shafts and formed with opposite side walls loosely mounted on said hubs of the spur-gears, and having their inner faces provided with inwardly-extending hubs loosely mounted on said hubs of the spur-gears and engaged with outer side faces of the main bodies of the spur-gears, and a pair of pinions having their ends supported by the side walls of the power-transmitting member and their axes disposed substantially parallel with the axes of the shafts, said pinions being engaged with each other and respectively engaged with the spur-gears, substantially as and for the purpose specified.

4. In a differential gear, the combination of two alined shafts arranged end to end, two spur-gears disposed side by side and fixed respectively to the shafts, said spur-gears having their inner side faces provided with projecting hubs, a sleeve interposed between the main bodies of the spur-gears and closely fitting said hubs, a hollow power-transmitting member disconnected from the sleeve and arranged concentric with the shafts and the sleeve, said power-transmitting member being formed with opposite side walls at the outer sides of the peripheral faces of the spur-gears having their inner faces provided with inwardly-extending hubs engaged with outer side faces of the spur-gears, and a pair of pinions interposed between the sleeve and the peripheral wall of the hollow power-transmitting member and having their ends supported by the side walls of the power-transmitting member and their axes disposed substantially parallel with the axes of the shafts, said pinions being engaged with each other and respectively engaged with the spur-gears, substantially as and for the purpose specified.

5. In a differential gear, the combination of two alined driven shafts arranged end to end, two spur-gears disposed side by side and fixed respectively to the shafts, said spur-gears having their inner and outer side faces provided with projecting hubs, a sleeve closely fitting the inner hubs of the spur-gears and having its end edges engaged with inner side faces of the main bodies of the spur-gears, a hollow power-transmitting member for driving both shafts, said member being disconnected from the sleeve, arranged concentric with the shafts and the sleeve and formed with opposite side walls loosely mounted on the outer hubs of the spur-gears and having their inner faces provided with inwardly-extending hubs loosely mounted on said outer hubs of the spur-gears and engaged with outer side faces of the main bodies of the spur-gears, and a pair of pinions interposed between the sleeve and the peripheral wall of the hollow power-transmitting member and having their ends supported by the side walls of the power-transmitting member and their axes disposed substantially parallel with the axes of the shafts, said pinions being engaged with each other and respectively engaged with the spur-gears, substantially as and for the purpose set forth.

6. In a differential gear, the combination of two alined shafts arranged end to end, two spur-gears disposed side by side and fixed respectively to the shafts, a hollow power-transmitting member arranged concentric with the shafts and formed with a peripheral wall and opposite side walls disposed at the outer sides of the peripheral faces of the spur-gears, one of the side walls being separable from the corresponding end of the peripheral wall and being formed with a toothed periphery and a flange projecting from its inner face and lapped upon the contiguous portion of the periphery of said peripheral wall, and a pair of pinions having their ends supported by the side walls of the power-transmitting member and their axes disposed substantially parallel with the axes of the shafts, said pinions being engaged with each other and respectively engaged with the spur-gears, substantially as and for the purpose described.

7. In a differential gear, the combination of two alined shafts arranged end to end, two spur-gears disposed side by side and fixed respectively to the shafts, a hollow power-transmitting member arranged concentric with the shafts and formed with a peripheral wall and opposite side walls disposed at the outer sides of the peripheral faces of the spur-gears, the peripheral wall being fixed at one end to one of the side walls, and the opposite side wall being separable from the other end of the peripheral wall, and being formed with a toothed periphery and a flange projecting from its inner face and lapped upon the contiguous portion of the periphery of said peripheral wall, and a pair of pinions having their ends supported by the side walls of the power-transmitting member and their axes disposed substantially parallel with the axes of the shafts, said pinions being engaged with each other and respectively engaged with the spur-gears, substantially as and for the purpose described.

8. In a differential gear, the combination of two alined shafts arranged end to end, two spur-gears disposed side by side and fixed respectively to the shafts, a hollow power-transmitting member arranged concentric with the shafts and formed with a peripheral wall and opposite side walls disposed at the outer sides of the peripheral faces of the spur-gears, one of the side walls being formed with openings extending through its inner and outer faces, the peripheral wall being fixed at one end to said side wall and having its internal face formed with inwardly-projecting extensions, and the opposite side wall being separable from the other end of the peripheral wall and provided with a toothed periphery, openings extending through its inner and outer faces and a flange projecting from its inner face and lapped upon the contiguous portion of the periphery of said peripheral wall, a pair of spindles disposed substantially parallel with the axes of the shafts and having corresponding extremities fixed in the openings in one of the side walls of the power-transmitting member and their other extremities detachably arranged in the openings in the opposite side wall of said member, pinions mounted on the spindles and projecting between said extensions and engaged with each other and respectively engaged with the spur-gears, and means for securing the separable side wall to said extensions independently of the spindles, substantially as and for the purpose specified.

9. In a differential gear, the combination of two alined shafts, a hollow power-transmitting member arranged concentric with the shafts and having openings in opposite walls, two spur-gears mounted respectively on the shafts within the hollow power-transmitting member and having their adjacent sides provided with hubs and annular faces at the bases of the hubs, said gears having their outer sides provided with hubs projecting through said openings beyond the outer faces of said walls of the power-transmitting member, a sleeve engaging the peripheries of the hubs and having its end edges engaged with the annular faces, fastening members engaged with the shafts and the projecting ends of the hubs on the outer sides of the spur-gears, and a pair of pinions having their opposite ends supported by said walls of the power-transmitting member and their axes disposed substantially parallel with the axes of the shafts, said pinions being engaged with each other and respectively engaged with the spur-gears, substantially as and for the purpose set forth.

In testimony whereof I have hereunto signed my name, in the presence of two attesting witnesses, at Syracuse, in the county of Onondaga, in the State of New York, this 22d day of December, 1900.

ALEXANDER T. BROWN.

Witnesses:
    S. DAVIS,
    D. LAVINE.